Figure 1:
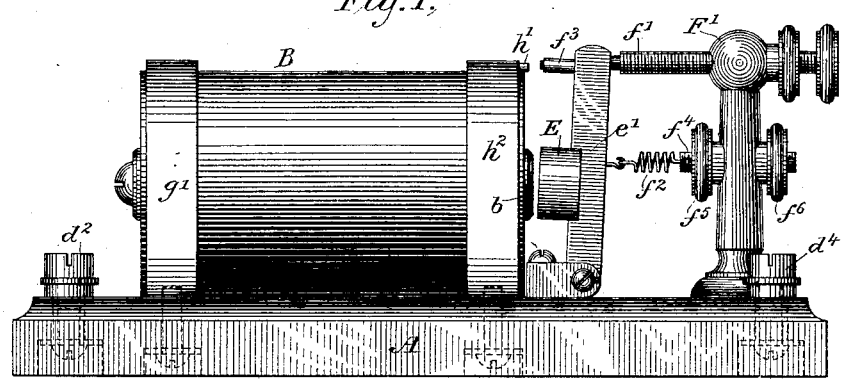

(No Model.)

H. A. PITCHER.
LIGHTNING PROTECTOR.

No. 317,848. Patented May 12, 1885.

Witnesses
Wm A. Skinkle
Jos. S. Latimer

Inventor
Horace A. Pitcher,
By his Attorneys
Pope & Edgcomb

UNITED STATES PATENT OFFICE.

HORACE A. PITCHER, OF PHILADELPHIA, PENNSYLVANIA, ASSIGNOR, BY MESNE ASSIGNMENTS, TO ROBERT F. WILLIAMS, OF NEW YORK, N. Y.

LIGHTNING-PROTECTOR.

SPECIFICATION forming part of Letters Patent No. 317,848, dated May 12, 1885.

Application filed July 3, 1884. (No model.)

*To all whom it may concern:*

Be it known that I, HORACE A. PITCHER, a citizen of the United States, residing in Philadelphia, in the county of Philadelphia and State of Pennsylvania, have invented certain new and useful Improvements in Lightning-Protectors, of which the following is a specification.

My invention relates to the class of instruments employed for the purpose of protecting telegraphic and other electrical instruments from being destroyed by the action of currents of abnormal strength which may through accident be caused to traverse a circuit in which the instruments are included. Various instruments have been devised for the purpose of accomplishing this result, and these have been designed in some instances to cut the instruments entirely out of circuit when the conductors are traversed by abnormal currents, while in other instances they are designed to establish a shunt-circuit around the same. Still another class serves to establish an earth-connection for the main conductor independently of the circuit-connections through the instruments. In certain classes of electrical circuits it is essential that the normal connections of the line shall not at any time be interrupted, because of the liability of an imperfect electrical connection being made between the contact-points which must then be relied upon to normally complete the circuit. An instance of this is found in the case of fire-alarm telegraph systems, where it is very essential that the signal-transmitting boxes shall always be in circuit, and that there shall be no possibility of the circuit becoming interrupted by reason of an imperfect connection being made at any contact-points. For this reason an instrument which is organized to cut the signal-boxes entirely out of circuit or to disconnect them from the main line when the conductors are traversed by abnormal currents is unsuited; and it is desirable, therefore, that an instrument should be employed which, while capable of affording for the abnormal current a path around the instrument to be protected, will at the same time render it unnecessary to disconnect those instruments from the line. It is essential, moreover, that the apparatus be constructed so that it will respond to the abnormal currents with such promptness that the shunt-circuit shall be established before the instruments which are to be protected can be injured by the current.

To this end my invention consists, generally, in constructing an electro-magnet with two coils, one end of each coil being connected with the main line, while the remaining ends are connected with the conductor including the instruments to be protected. Normally, therefore, a current from either direction traverses first one coil of the electro-magnet, then the instrument to be protected, and then the second coil of the electro-magnet. The circuit-connections, moreover, are such that the currents will traverse both coils in the same direction. The instruments to be protected are thus included in the circuit of the main line between the two coils of the electro-magnet, so that, whether the current be considered as traversing the main line to the instrument from one direction or the other or whether it be considered as a positive current coming from one direction and a negative current simultaneously proceeding from the other direction, it is evident that the current must traverse at least one coil of the electro-magnet before it reaches the protected instrument, and the electro-magnet will thus be vitalized before the current reaches that instrument. Applied to the electro-magnet is an armature-lever which normally rests against an insulated back contact-stop. There is also applied to this lever a front contact-stop, which is in electrical connection with that terminal of one of the coils which is connected with the main line. The armature-lever is in like manner in electrical connection with the corresponding terminal of the other coil, so that when the lever is drawn toward the electro-magnet a shunt-circuit will be completed directly across from the incoming to the outgoing terminal of the main line, thus shunting the coils of the electro-magnet and the instruments included in the circuit therewith. The armature and its lever are so adjusted that they will not respond to currents of the strength normally employed for actuating the alarm, telegraphic, or other apparatus, but they will readily respond to currents having sufficient strength to do injury to the instruments included in the circuit, and when they have thus responded and the shunt-circuit has been established a fraction of the current will traverse the normal circuit through the electro-magnet, and this, while not of sufficient strength to injure the instruments, will be sufficient to retain the armature in its forward position, thus keeping the shunt-circuit closed.

Figure 2:
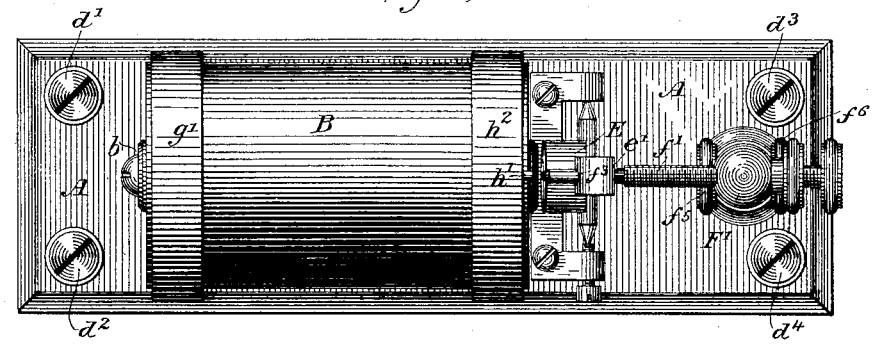
Figure 3:
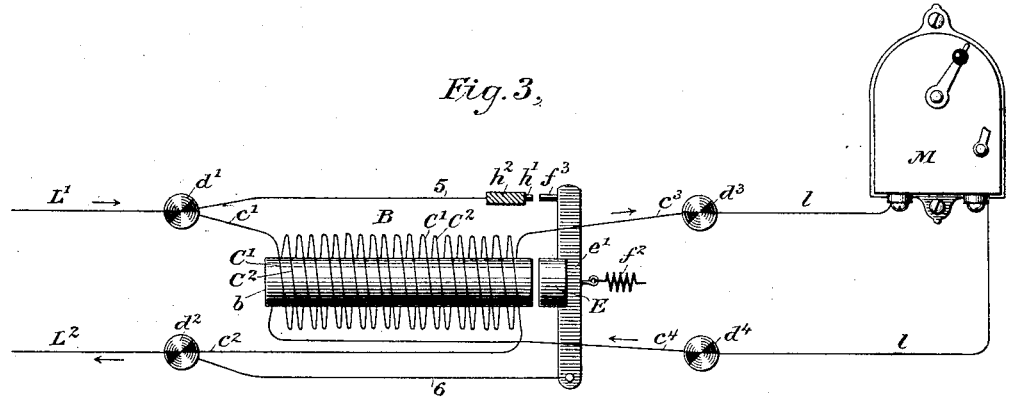

In the accompanying drawings, Figure 1 is a side elevation, and Fig. 2 is a plan view, of an instrument embodying the features of my invention. Fig. 3 is a diagram showing the circuit-connections.

Referring to the drawings, A represents a suitable base, upon which is placed an electro-magnet, B. This electro-magnet is provided with two coils of insulated wire, which for convenience may be considered as constructed by winding two insulated conductors, $C'$ and $C^2$, upon the core $b$ at the same time. One terminal, $c'$, of the conductor $C'$ is connected with the binding-post $d'$, to which it is designed that the main line $L'$ shall be connected. The opposite terminal, $c^2$, of the second coil, $C^2$, is connected in like manner with the binding-post $d^2$, and this binding-post is intended to receive the terminal of the main line $L^2$. The second terminal, $c^3$, of the first coil, $C'$, is connected with the binding-post $d^3$, and the second terminal, $c^4$, of the second coil, $C^2$, is connected with the binding-post $d^4$. The respective terminals of the local conductor $l$, in which are included the instrument M, which is to be protected, are connected with the binding-posts $d^3$ and $d^4$, respectively. It will be seen, therefore, that the normal circuit-connections are from the main line $L'$ to the binding-post $d'$, through the coil $C'$ to the binding-post $d^3$, thence through the conductor $l$, including the instrument M, to the binding-post $d^4$, and thus, through the coil $C^2$, to the binding-post $d^2$, and to the main line $L^2$. Whether, therefore, a current be considered as passing from the main line $L'$ to the instrument or from the main line $L^2$ to the instrument, or whether it be considered as a positive current from the line $L'$ and a negative current from the line $L^2$, it will be understood that it will be impossible for such current to reach the instrument M until it has traversed one coil of the electro-magnet B. The electro-magnet will thus be vitalized before the current can have injured the instrument.

Applied to the electro-magnet B is an armature, E, carried upon a lever, $e'$. This lever is normally held against an insulated back contact-stop, $f'$, which is carried upon a suitable standard, F'. The armature-lever is normally held backward by an adjustable retractile spring, $f^2$, which extends from the lever to an adjustable screw, $f^4$, extending through the standard or post F'. Suitable nuts, $f^5$ and $f^6$, are applied to this screw for the purpose of adjusting its position, and thus the tension exerted by the spring upon the armature-lever. The resting-stop $f'$ of the armature-lever is either of insulating material, or else the post F' itself is insulated from the remaining parts of the instrument. Applied to the armature-lever is a front contact-stop, $h'$, and this stop is, for convenience in construction, carried upon a metallic band, $h^2$, which surrounds the electro-magnet and holds it in position upon the base A. A similar band, $g'$, is applied to the other extremity of the electro-magnet for the purpose of assisting in holding it in position. The band $h^2$, and thus the point $h'$, are placed in electrical connection through a conductor, 5, with the binding-post $d'$. In like manner the armature-lever $e'$, and thus the contact-point $f^3$, carried at its extremity, are placed in electrical connection through a conductor, 6, with a binding-post, $a^2$. The conductors 5 and 6, which serve thus to place the two binding-posts $d'$ and $d^2$ in electrical connection with each other when the armature-lever is in its forward position are of such size and conductivity that the shunt-circuit, which is established by the forward movement of the lever, will offer much less resistance than the circuit through the coils of the electro-magnet and the conductor $l$. The greater portion therefore of an abnormal current will traverse this conductor when the electro-magnet has been vitalized sufficiently to draw its armature into its forward position, and the portion of the current which will traverse the coils of the electro-magnet and conductor $l$ is insufficient to do injury to the instrument M, although it will be sufficient to retain the armature-lever in its forward position.

In the drawings I have shown at M an instrument of the character employed in fire-alarm telegraphs, the purpose of which is to interrupt the main-line connections a predetermined number of times when the instrument is actuated for the purpose of transmitting an arbitrary signal to the central station. Various other instruments, either electro-magnets or other circuit-controllers, having delicate contact-points, may, if desired, be included in the conductor $l$. It will be observed that the circuit-connections of this instrument are not changed when the electro-magnet is vitalized, and that should the shunt-circuit be established through the instrumentality of the electro-magnet B the circuit-connections of the instrument will be retained, and immediately upon the cessation of the abnormal current the instrument will be in a condition to operate. If for any reason the armature-lever $f'$ should be retained in its forward position, or should the adjustment of the retractile spring $f^4$ be such that it will permit the armature to be drawn into its forward position under the influence of a current of normal strength, it will not in any way prevent the operation of the transmitting-instrument M, as will be understood, when it is considered that the electro-magnet B depends for its magnetism upon the current which also traverses the conductor $l$. If, therefore, the instrument M be actuated so as to interrupt and establish the circuit-connections through the conductor $l$, the electro-magnet B will also be magnetized and demagnetized in the corresponding manner, so that its armature-lever will be actuated in correspondence with the interruptions of the circuit-connections through the conductor $l$. The connections between the conductors $L'$ and $L^2$ will thus be made and interrupted by means of the armature-lever $e'$, in conformity to the interruptions of the circuit-connections through the conductor $l$, and a signal will be transmitted upon the main line identical with that which is normally transmitted by the action of the instrument M.

I claim as my invention—

1. The combination, substantially as hereinbefore set forth, with an electrical instrument and a conductor including the same, of an electro-magnet having two magnetizing-coils respectively connected with the terminals of said conductor, an armature-lever applied to said electro-magnet and connected with the remaining terminal of one of said coils, and a contact-stop applied to said armature-lever and connected with the remaining terminal of the other of said coils.

2. The combination, substantially as hereinbefore set forth, with an electrical instrument and a conductor in which said instrument is included, of an electro-magnet having two magnetizing-coils connected in series with said electrical instrument and respectively located upon opposite sides of the same, and a shunt-circuit across the outer terminals of said coils, which circuit is established by the action of said electro-magnet.

3. The combination, substantially as hereinbefore set forth, with an electro-magnet having two magnetizing-coils, of an armature and armature-lever applied to said electro-magnet, an adjustable retractile spring applied to said armature-lever, an insulated back contact-stop against which said armature is normally held by the action of said retractile spring, two front contact-stop, two binding-posts which are respectively connected with the outer terminal of one of said magnetizing-coils and the inner terminal of the other of said coils, and also with said contact-stop and said armature-lever, respectively, and two binding-posts which are respectively connected with the inner terminal of the first-named magnetizing-coil and with the outer terminal of the second magnetizing-coil.

4. The combination, substantially as hereinbefore set forth, of an electro-magnet having two independent magnetizing-coils, an armature-lever applied to the same, a front contact-stop applied to said armature-lever, a metallic band serving to secure said electro-magnet to its base and carrying said contact-stop, and means, substantially such as described, for placing said armature-lever in contact with said front contact-stop.

In testimony whereof I have hereunto subscribed my name this 2d day of July, A. D. 1884.

HORACE A. PITCHER.

Witnesses:
 DANL. W. EDGECOMB,
 CHARLES A. TERRY.